Patented July 25, 1950

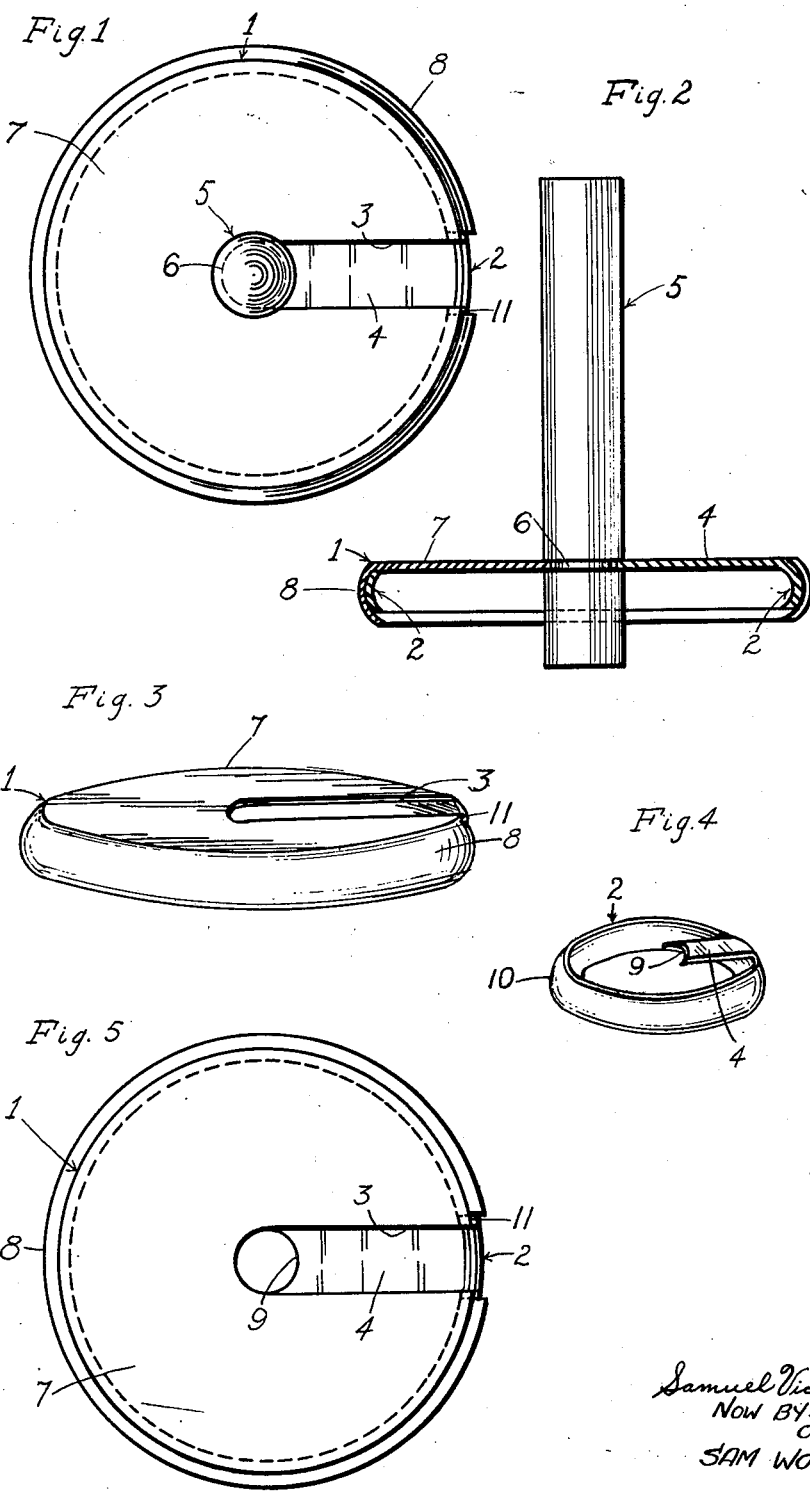

2,516,605

UNITED STATES PATENT OFFICE 2,516,605

DETACHABLE FLANGE FASTENER

Samuel Victor, Chicago, Ill., now by judicial change of name, Sam Women Sam

Application March 25, 1948, Serial No. 17,026

6 Claims. (Cl. 85—8)

This invention relates to pins, bolts, et cetera and detachable flange fasteners therefor. An object of this invention is to provide an inexpensive detachable flange fastener. Other objects become apparent as the description proceeds.

Figure 1 is an end view of a pin having a circumferential groove in assembly with a detachable flange fastener.

Figure 2 is an axial, sectional view of the fastener in assembly with a pin shown in relief.

Figure 3 is a perspective view of the open washer member of the fastener.

Figure 4 is a perspective view of the locking member of the fastener.

Figure 5 is a top view of the flange fastener.

In Figure 1, is shown a pin 5 having a circumferential groove 6. A detachable flange fastener comprising an open washer member 1 with its disc element 7 and circumferential, arcuate flange 8 and radial slot 3, is shown in assembly with locking member 2 with its tongue 4. A cut out portion 11 of the flange 8 accommodates the insertion of the non-grooved portion of the pin 5 below the disc 7.

Other locking members than locking member 2 may be used such as a spring wire formed similarly.

Locking member 2 should be flexible and resilient.

In order to assemble a grooved pin, bolt et cetera with the detachable flange fastener, the open washer member 1 and the locking member 2 may be separate. The open washer member 1 may be inserted in the groove by engaging its slot 3 with the groove 6 and sliding it centrally. Then the arcuate end 9 of the tongue 4 may be inserted into the open portion of the groove 6 within the slot 3 and then the arcuate ring 10 should be pressed resiliently into the flange 8. The fastener may be used with an ungrooved pin etc.

I claim:

1. A detachable flange fastener for use with a pin, bolt et cetera, comprising: an open washer member having a peripheral axially extending annular flange with an axially arcuate inner surface, said open washer and flange being provided with a radial slot with which the pin, bolt et cetera may be slidably engaged; and a locking member having an annular flange with an axially extending arcuate outer surface shaped to engage the inner surface of the flange on the open washer member; said locking member having an integral flexible resilient radial tongue with an arcuate end portion adapted to lock the pin, bolt et cetera in and to snap into the slot of the washer member by engaging the pin, bolt et cetera therein.

2. A detachable fastener for use with a pin, bolt et cetera having a circumferential groove, said fastener comprising: an open washer member adapted to engage said groove, having a peripheral axially extending annular flange with an axially arcuate inner surface, said open washer member and flange being provided with a radial slot with which the groove in the pin, bolt et cetera may be slidably engaged; and a locking member having an annular flange with an axially extending arcuate outer surface shaped to engage the inner surface of the flange of the open washer member; said locking member having an integral flexible resilient tongue with an arcuate end portion adapted to lock the pin, bolt et cetera in, and to snap into the slot of the washer member by engaging the groove therein; said flange of the washer member having a void portion to clear the ungrooved portion of the pin, bolt et cetera when the washer member is being inserted in or removed from the pin, bolt et cetera.

3. A detachable flange fastener for use with a pin, bolt et cetera and an open washer member having a peripheral axially extending annular flange with an axially arcuate inner surface, said open washer member and flange being provided with a radial slot with which the pin, bolt et cetera may be slidably engaged, comprising a locking member having an annular flange with an axially arcuate outer surface shaped to engage the inner surface of the flange on the open washer member; said locking member having an integral flexible resilient radial tongue with an arcuate end portion to lock the pin, bolt et cetera in, and to snap into the slot of the washer member by engaging the pin, bolt et cetera therein.

4. A detachable flange fastener for use with a pin, bolt et cetera, comprising: an open washer member having a peripheral axially extending annular flange, said open washer member and flange being provided with a radial slot with which the pin, bolt et cetera may be slidably engaged; and a locking member having an annular flange with an outer surface shaped to engage the inner surface of the flange on the open washer member; said locking member having an integral flexible resilient radial tongue with an arcuate end portion adapted to lock the pin, bolt et cetera in, and to snap into the slot of the open washer member by engaging the pin, bolt et cetera therein.

5. A detachable fastener for use with a pin, bolt et cetera having a circumferential groove, said fastener comprising: an open washer member adapted to engage said groove, having a peripheral axially extending flange, said open washer member and flange being provided with a radial slot with which the groove in the pin, bolt et cetera may be slidably engaged; and a locking member having an annular flange with an outer surface shaped to engage the inner surface of the flange of the open washer member, said locking member having an integral flexible resilient radial tongue with an arcuate end portion adapted to lock the pin, bolt et cetera in, and to snap into the slot of the open washer member by engaging the groove therein; said flange of the open washer member having a void portion to clear the ungrooved portion of the pin, bolt et cetera when the open washer member is being inserted in or removed from the pin, bolt et cetera.

6. A detachable flange fastener for use with a pin, bolt et cetera and an open washer member having a peripheral axially extending annular flange, said open washer member and flange being provided with a radial slot with which the pin, bolt et cetera may be slidably engaged, comprising a locking member having an annular flange with an outer surface shaped to engage the inner surface of the flange on the open washer member; said locking member having an integral flexible resilient radial tongue with an arcuate end portion to lock the pin, bolt et cetera in, and snap into the slot of the open washer member by engaging the pin, bolt et cetera therein.

SAMUEL VICTOR.

REFERENCES CITED

The following references are of record in the file of this patent:

UNITED STATES PATENTS

| Number | Name | Date |
|---|---|---|
| 320,392 | Peterson | June 16, 1885 |
| 480,336 | Monday | Aug. 9, 1892 |
| 553,311 | Nevill | Jan. 21, 1896 |
| 1,058,583 | Hart | Apr. 8, 1913 |
| 1,452,165 | Michael | Apr. 17, 1923 |
| 1,684,745 | Roberts | Sept. 18, 1928 |
| 2,040,960 | Smith | May 19, 1936 |
| 2,055,315 | Sessa | Sept. 22, 1936 |
| 2,059,111 | Joyce | Oct. 27, 1936 |
| 2,235,530 | Mercer | Mar. 18, 1941 |